(12) United States Patent
Rihan et al.

(10) Patent No.: US 7,446,149 B2
(45) Date of Patent: Nov. 4, 2008

(54) FAST DRYING CLEARCOAT REFINISH COMPOSITION

(75) Inventors: Ali Rihan, Toledo, OH (US); Emerson Keith Colyer, Waterville, OH (US)

(73) Assignee: BASF Corporation, Southfield, MI (US)

( * ) Notice: Subject to any disclaimer, the term of this patent is extended or adjusted under 35 U.S.C. 154(b) by 1404 days.

(21) Appl. No.: 09/965,423

(22) Filed: Sep. 27, 2001

(65) Prior Publication Data

US 2003/0059547 A1   Mar. 27, 2003

(51) Int. Cl.
*C08L 33/14*   (2006.01)
*B05D 7/16*   (2006.01)

(52) U.S. Cl. .................. 525/228; 525/216; 525/223; 525/374; 427/407.1; 427/409; 427/412.5

(58) Field of Classification Search .................. 526/319, 526/320, 329.7, 280; 427/407.1, 409, 412.5; 524/507, 558, 548, 590, 561; 525/374, 124, 525/216, 223, 228
See application file for complete search history.

(56) References Cited

U.S. PATENT DOCUMENTS

| | | | |
|---|---|---|---|
| 5,362,521 A | | 11/1994 | Ozaki et al. |
| 5,716,678 A | * | 2/1998 | Rockrath et al. ............ 427/379 |
| 5,759,631 A | * | 6/1998 | Rink et al. ............... 427/407.1 |
| 5,783,632 A | | 7/1998 | Loney-Crawford |

FOREIGN PATENT DOCUMENTS

| | | |
|---|---|---|
| EP | 1 013 730 A1 | 12/1999 |
| GB | 1092884 | 1/1965 |
| WO | WO 97/22646 | 6/1997 |

OTHER PUBLICATIONS

Emerson Keith Colyer and Henry J. Stateczny, U.S. Appl. No. 09/850,837, filed May 8, 2001.
Emerson Keith Colyer and Douglas H. Larrow, U.S. Appl. No. 09/886,742, filed Jun. 21, 2001.
Zezza C. A, et al: Entitled "Viscosity reduction VIA monomer selection in solvent-borne high-solids styrene/acrylic coating resins" Journal of Coating Technology, Philadelphia, PA, US, vol. 68, No. 856, May 1, 1996 pp. 49-54, XP000607951.
JP 2001 342221 A (Nippon Shokubai Co. LTD, Nov. 12, 2001.
International Search Report for PCT/US 02/24836 filed Jul. 26, 2002.

* cited by examiner

*Primary Examiner*—Helen L. Pezzuto
(74) *Attorney, Agent, or Firm*—Harness, Dickey & Pierce, P.L.C.

(57) ABSTRACT

A refinish clearcoat composition includes an hydroxyl-functional acrylic polymer. The acrylic polymer has a number average molecular weight of at least about 5000 and is polymerized using at least about 45% by weight cycloaliphatic monomer, based on total monomer weight polymerized. The clearcoat composition is fast drying. Optionally, the clearcoat is cured by low temperature baking. The cured clearcoat surface may be taped without leaving tape marks as soon as the substrate is cooled. The cured clearcoat may undergo wet sanding after baking as soon as the part is cooled, and can then be buffed back to a high gloss finish after sanding and washing.

24 Claims, No Drawings

FAST DRYING CLEARCOAT REFINISH COMPOSITION

FIELD OF THE INVENTION

The present invention relates to automotive refinish compositions and to methods for preparing and using such compositions.

BACKGROUND OF THE INVENTION

Automotive topcoat finishes today are predominantly basecoat/clearcoat topcoats, in which the topcoat is applied in two layers, a first layer of a pigmented basecoat composition and a second layer of a clearcoat composition. Basecoat/clearcoat coatings are desirable for their high level of gloss and depth of color. In addition, basecoats having special effect pigments, e.g., flake pigments such as metallic and pearlescent pigment, can achieve excellent gonioapparent effect in basecoat/clearcoat coatings.

In order to provide optimum match to the appearance of the original finish, automotive refinish topcoats are also being applied in separate layers of basecoat and clearcoat. Unlike the original finish coating compositions, which are typically cured at temperatures of 110°C. or higher, automotive refinish coatings must be formulated as either thermoplastic compositions of thermosetting compositions that cure at relatively low temperatures because many components of a finished vehicle cannot withstand high temperature bakes. Nonetheless, thermosetting compositions are generally preferred as providing more durable and scratch- and mar-resistant coatings. Thermosetting refinish compositions are usually designed to cure at ambient temperatures, including by oxidation or radiation curing, or low bakes. Although the coating may not develop full cure for hours or days, it is desirable to have the coating become "dry to handle" (that is, not tacky) within a reasonably short time. Shorter dry to handle times also reduce the chance that the coating could become contaminated with airborne particulates. This is particularly true for clearcoat compositions, which are not covered by other coatings layers and for which a smooth, unblemished surface is critical to obtaining the desired appearance.

In many thermosetting automotive refinish clearcoat compositions the curing agent reacts with the main resin or polymer at room temperatures within a reasonable amount of time without heating or with heating at low temperatures of perhaps up to 150°F. Given the reactivity between the curing agent and the main resin or polymer at typical storage temperatures, these materials are segregated into separately stored components until just shortly before application of the coating composition to the substrate. This type of coating composition, in which the materials that react to cure the coating are segregated in two separately stored components, is referred to in the art as a "two-component" or "two-package" or "2K" coating composition. Refinish clearcoat compositions, which are unpigmented, are often two-package compositions. Refinish clearcoats may also be three-component or three-package systems, in which a third component contains solvents or resin solutions for adjusting the viscosity of the clearcoat or contains other reactants.

Cost and solvent content are further concerns in formulating automotive refinish coating compositions. For example, cellulose acetate butyrate (CAB) resins have been used to shorten the dry to handle time and as rheology control additives in refinish coatings, but coating compositions containing these CAB materials require an undesirably high amount of organic solvent. In addition, these CAB materials are relatively expensive and require added steps in the coatings manufacturing process. Finally, the CAB materials are specialty products that are not widely manufactured.

It would be desirable, therefore, to have a coating composition (whether in a single package or as a multi-component system) with a short tack-free drying time, good metal control, that is less expensive, and that could be applied with a lesser amount of regulated emissions.

SUMMARY OF THE INVENTION

The invention provides a refinish clearcoat composition including an hydroxyl-functional acrylic polymer. The hydroxyl-functional acrylic polymer has a number average molecular weight of at least about 5000 daltons and contains at least about 45% by weight of one or more cycloaliphatic monomers. The refinish clearcoat composition further includes at least one film-forming polymer. The hydroxyl-functional acrylic polymer is at least about 5% by weight, and up to about 60% by weight, of the combined weights of the hydroxyl-functional acrylic polymer and the film-forming polymer(s). Preferably, the refinish clearcoat further includes at least one curing agent. The acrylic polymer of the invention provides excellent fast drying after application with good application and physical properties. In particular, the clearcoat coating composition can be applied without sagging, popping or cratering.

The invention further provides an multi-component coating system for preparing the clearcoat composition of the invention. The multi-component system includes a package or component containing the hydroxyl-functional acrylic polymer and at least one film-forming polymer and a second package containing a curing agent that cures the acrylic polymer and/or the film-forming polymer in the first package. The multi-component system optionally includes a third component containing solvent, optionally one or more polymers or resins, and optionally other cure catalysts or reactants.

Still further, the invention provides a method of refinishing a substrate, which includes steps of applying a refinish basecoat composition to a desired area of the substrate, allowing the applied basecoat layer to dry, and then applying over the basecoat layer the clearcoat composition of the invention. The clearcoat composition is fast drying. Optionally, the clearcoat is cured by low temperature baking. The clearcoat surface may be taped without leaving tape marks as soon as the substrate is cooled.

It is particularly desirable for the clearcoat composition to be thermosetting in order to provide a durable, scratch- and mar-resistant coating. In the composite basecoat/clearcoat coating. The clearcoat may undergo wet sanding after baking as soon as the part is cooled, and can then be buffed back to a high gloss finish after sanding and washing.

DETAILED DESCRIPTION OF THE INVENTION

The refinish clearcoat composition includes an hydroxyl-functional acrylic polymer and a film-forming polymer in a transparent composition. The hydroxyl-functional acrylic polymer has a number average molecular weight of at least about 5000, preferably at least about 8000, and even more preferably at least about 10,000, and preferably up to about 30,000. The hydroxyl-functional acrylic polymer also preferably has a weight average molecular weight of at least about 17,000, more preferably at least about 19,000, and even more preferably at least about 20,000 daltons. Molecular weights may be determined by gel permeation chromatography using polystyrene standards.

The acrylic polymer is polymerized using one or more cycloaliphatic monomers. Suitable examples of cycloaliphatic monomers include, without limitation, cyclohexyl (meth)acrylate, (meth)acrylate esters of alkyl-substituted cyclohexanol, and (meth)acrylate esters of alkanol-substituted cyclohexane, such as 2-tert-butyl and 4-tert-butyl cyclohexyl (meth)acrylate, 4-cyclohexyl-1-butyl (meth)acrylate, and 3,3,5,5,-tetramethyl cyclohexyl (meth)acrylate; isobornyl (meth)acrylate; isomenthyl (meth)acrylate; cyclopentyl (meth)acrylate, (meth)acrylate esters of alkyl-substituted cyclopentanols, and (meth)acrylate esters of alkanol substituted cyclopentanes; adamantanyl (meth)acrylates; cyclododecyl (meth)acrylate; cycloundecanemethyl (meth)acrylate; dicyclohexylmethyl (meth)acrylate; cyclododecanemethyl (meth)acrylate; menthyl (meth)acrylate; and so on, as well as combinations of these. The term (meth)acrylate is used herein to indicated both the acrylate ester and the methacrylate ester. Preferred among these are cyclohexyl (meth)acrylate and isobornyl (meth)acrylate.

The cycloaliphatic monomer units are included in the acrylic polymer in amounts of at least about 45% by weight, preferably at least about 60% by weight, and more preferably at least about 65% by weight of the polymer. It is advantageous for the cycloaliphatic monomer units to be included in the acrylic polymer in amounts of up to about 85% by weight, particularly up to about 80% by weight, and especially up to about 75% by weight of the polymer. The upper limit on the amount of cycloaliphatic monomer unit depends upon factors such as the particular monomer used, the viscosity obtained in the acrylic polymer using the monomer, the amount of hydroxyl monomer and other monomers used, and so on.

The acrylic polymer also has hydroxyl functionality. Hydroxyl functionality can conveniently be introduced to the polymer by copolymerizing at least one hydroxyl-functional monomer. The hydroxy-functional ethylenically unsaturated monomer is preferably an alkyl ester of acrylic or methacrylic acid. (In the context of describing the present invention, the term "(meth)acrylate" will be used to indicate that both the methacrylate and acrylate esters are included.) Suitable examples of hydroxyl-functional monomers include, without limitation, hydroxyethyl (meth)acrylate, hydroxypropyl (meth)acrylates, hydroxybutyl (meth)acrylates, hydroxyhexyl (meth)acrylates, other hydroxyalkyl (meth)acrylates having branched or linear alkyl groups of up to about 10 carbons, and mixtures of these. Preferably, at least about 5% by weight hydroxyl-functional monomer is included in the polymer. It is also preferred to include up to about 15% by weight hydroxyl-functional monomer in the polymer. Caprolactone esters of these hydroxyl-functional monomers are also included among preferred compounds. Alternatively, caprolactone can be reacted with the hydroxyl group of the addition polymer after the polymerization reaction according to known methods. Particularly preferred as the hydroxy-functional ethylenically unsaturated monomer are hydroxyethyl (meth)acrylate, hydroxypropyl (meth)acrylates, and mixtures of these. The person skilled in the art will appreciate that hydroxyl groups can be generated by other means, such as, for example, the ring opening of a glycidyl group, for example from glycidyl methacrylate, by an organic acid or an amine. Hydroxyl functionality may also be introduced through thio-alcohol compounds, including, without limitation, 3-mercapto-1-propanol. 3-mercapto-2-butanol, 11-mercapto-1-undecanol, 1-mercapto-2-propanol, 2-mercaptoethanol, 6-mercapto-1-hexanol, 2-mercaptobenzyl alcohol, 3-mercapto-1,2-proanediol, 4-mercapto-1-butanol, and combinations of these. In one preferred embodiment, the acrylic polymer has an hydroxyl number of at least about 15 mg KOH/g polymer, more preferably at least about 40 mg KOH/g polymer, yet more preferably at least about 45 mg KOH/g polymer, and still more preferably at least about 50 mg KOH/g polymer. It is also preferred for the acrylic polymer to have an hydroxyl number of up to about 115 mg KOH/g polymer, more preferably up to about 90 mg KOH/g polymer, more preferably up to about 75 mg KOH/g polymer, still more preferably up to about 60 mg KOH/g polymer. The hydroxyl functionality may be incorporated by any method or by any combination of methods.

Other monomers may be copolymerized with the cycloaliphatic monomer and the hydroxyl monomer (and/or the hydroxy thiol compound and/or monomer that provides hydroxyl functionality through further reaction after polymerization). Examples of suitable co-monomers include, without limitation, $\alpha,\beta$-ethylenically unsaturated monocarboxylic acids containing 3 to 5 carbon atoms such as acrylic, methacrylic, and crotonic acids and the esters, nitriles, or amides of these acids; $\alpha,\beta$-ethylenically unsaturated dicarboxylic acids containing 4 to 6 carbon atoms and the anhydrides, monoesters, and diesters of those acids; vinyl esters, vinyl ethers, vinyl ketones, vinyl amides, and aromatic or heterocyclic aliphatic vinyl compounds. Representative examples of suitable esters of acrylic, methacrylic, and crotonic acids include, without limitation, those esters from reaction with saturated aliphatic alcohols containing 1 to 20 carbon atoms, such as methyl, ethyl, propyl, isopropyl, n-butyl, isobutyl, tert-butyl, hexyl, 2-ethylhexyl, dodecyl, lauryl, and stearyl acrylates, methacrylates, and crotonates; and polyalkylene glycol acrylates and methacrylates. Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol. Representative examples of co-polymerizable vinyl monomers include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, $\alpha$-methyl styrene, vinyl toluene, tert-butyl styrene, and 2-vinyl pyrrolidone. The co-monomers may be used in any combination. In one preferred embodiment, the hydroxyl-functional acrylic polymer is prepared using a mixture of monomers that includes styrene, n-butyl acrylate, and n-butyl methacrylate (at least about 1% and up to about 20% by weight in combination, based on the total weight of monomers polymerized) and an amine functional acrylic or methacrylic ester (at least about 0.25% and up to about 20% by weight, based on the total weight of monomers polymerized). The monomers are preferably selected and apportioned so that an about 55% by weight solution of the acrylic polymer in n-butyl acetate has a viscosity of up to about 10 Stokes at 25° C., more preferably up to about 8.8 Stokes at 25° C.

The acrylic polymer may be prepared using conventional techniques, such as by heating the monomers in the presence of a polymerization initiating agent and optionally chain transfer agents. The polymerization is preferably carried out in solution, although it is also possible to polymerize the acrylic polymer in bulk.

Typical initiators are organic peroxides such as dialkyl peroxides such as di-t-butyl peroxide, peroxyesters such as t-butyl peroxy 2-ethylhexanoate, and t-butyl peracetate, peroxydicarbonates, diacyl peroxides, hydroperoxides such as t-butyl hydroperoxide, and peroxyketals; azo compounds such as 2,2'azobis(2-methylbutanenitrile) and 1,1'-azobis(cyclohexanecarbonitrile); and combinations of these. Typical chain transfer agents are mercaptans such as octyl mercaptan, n- or tert-dodecyl mercaptan; halogenated compounds, thiosalicylic acid, mercaptoacetic acid, mercaptoethanol and the other thiol alcohols already mentioned, and dimeric alpha-methyl styrene.

The reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be no more than about thirty minutes.

The clearcoat composition also includes at least one film-forming polymer. The film-forming polymer may be any polymer useful in clearcoat compositions. Examples include, without limitation, polyesters, polyurethanes, and other acrylic polymers.

Film-forming polyesters are formed from the esterification products of polycarboxylic acids or anhydrides of such acids with polyols and/or epoxides. Useful polyesters are linear, formed by reaction products of dicarboxylic acids and diols, or have a limited amount of branching, introduced by a reactant with a functionality greater than two. Preferably, an excess of equivalents of the polyol is used so that the polyester has terminal hydroxyl groups. Alternatively, if an excess of equivalents of acid functionality is used so that an acid-terminated polyester is formed, the acid groups can be reacted with a compound that has one or more hydroxyl groups and one or more groups reactive with acid groups, such as a triol, tetraol, and the like. The film-forming polyester may have a number average molecular weight of from about 3000 to about 25,000.

Examples of useful dicarboxylic acids and anhydrides include, without limitation, oxalic acid, malonic acid, succinic acid, glutaric acid, adipic acid, maleic acid, pimelic acid, terephthalic acid, isophthalic acid, phthalic acid, tetrahydrophthalic acid, hexahydrophthalic acid, fumaric acid, azelaic acid, sebacic acid, dimer fatty acid, benzenetricarboxylic acids, methyl hexahydrophthalic acid, glutamic acid, the anhydrides of these acids, and combinations of these acids and anhydrides. Monocarboxylic acids may be included in limited amounts, particularly when tri- or tetracarboxylic acids are included.

Examples of useful polyols include, without limitation, 1,4-butanediol, 1,3-butanediol, 2,3-butanediol, 1,2,4-butanetriol, 1,6-hexanediol, 1,2,6-hexanetriol, neopentyl glycol, ethylene glycol, propylene glycol, pentaerythritol, oligomers of these such as diethylene glycol, triethylene glycol, dipropylene glycol, and dipentaerythritol, glycerol, trimethylolpropane, cylcohexanedimethanols, 2-methyl-2-ethyl-1,3-propanediol, 2-ethyl-1,3-hexanediol, 1,5-pentanediol, thiodiglycol, 1,3-propanediol, 2,2,4-trimethyl-1,3-pentanediol, cyclohexanediols, mannitol, sorbitol, and combinations of these. Compounds having both acid and alcohol groups may be included, non-limiting examples of which are dimethylolpropionic acid, ricinoleic acid, and 12-hydroxylstearic acid.

Polyesters may also be prepared using lactones such as ε-caprolactone and δ-butyrolactone or diols thereof, for example the reaction product of ε-caprolactone and a diol such as ethylene glycol. The polyol or polyacid may also include fluorine or silane groups.

A film-forming polyurethane can be synthesized by reacting a polyol, preferably a diol, with a polyisocyanate, preferably a diisocyanate. The polyisocyanate can be an aliphatic polyisocyanate, including a cycloaliphatic polyisocyanate, or an aromatic polyisocyanate. The term "polyisocyanate" as used herein refers to any compound having a plurality of isocyanate functional groups on average per molecules. Polyisocyanates encompass, for example, monomeric polyisocyanates including monomeric diisocyanates, biurets and isocyanurates of monomeric polyisocyanates, extended polyfunctional isocyanates formed by reacting one mole of a diol with two moles of a diisocyanate or mole of a triol with three moles of a diisocyanate, and the like. Aliphatic polyisocyanates are preferred when the coating composition is an automotive topcoat composition. Useful examples include, without limitation, ethylene diisocyanate, 1,2-diisocyanatopropane, 1,3-diisocyanatopropane, 1,4-butylene diisocyanate, lysine diisocyanate, 1,4-methylene bis (cyclohexyl isocyanate), isophorone diisocyanate, toluene diisocyanate, the isocyanurate of toluene diisocyanate, diphenylmethane 4,4'-diisocyanate, the isocyanurate of diphenylmethane 4,4'-diisocyanate, methylenebis-4,4'-isocyanatocyclohexane, isophorone diisocyanate, the isocyanurate of isophorone diisocyanate, 1,6-hexamethylene diisocyanate, the isocyanurate of 1,6-hexamethylene diisocyanate, 1,4-cyclohexane diisocyanate, p-phenylene diisocyanate, triphenylmethane 4,4',4"-triisocyanate, tetramethyl xylene diisocyanate, and meta-xylene diisocyanate.

The polyol can be the same as the polyols described above for the preparation of polyesters. In a preferred embodiment, at least one oligomeric or polymeric polyol is used to prepare the polyurethane. Non-limiting examples of oligomeric or polymeric polyols are polyester polyols and polyether polyols. Polyester polyols or polyether polyols used in the synthesis of a film-forming polyurethane typically have a number average molecular weight of about 400 to about 5000.

Two general synthetic approaches may be utilized to prepare the polyurethane resin. A polyurethane having terminal hydroxy functionality can be obtained by reacting a diisocyanate and a diol in an OH:NCO equivalent ratio of greater than 1:1. In this case, the polyurethane resin formed will have terminal hydroxyl groups as a result of the equivalent excess of the polyol. Alternatively, the polyurethane may be formed by reacting polyisocyanate and polyol in an OH:NCO ratio of less than 1:1, thus forming a polyurethane having terminal isocyanate functionality, and then reacting the terminal isocyanate groups in a second step, sometimes called a capping step, with a compound having at least one group reactive with isocyanate functionality, which may be, for example, a hydroxyl group or a primary or secondary amine group, and at least one (or at least one additional) hydroxyl group or at least one group that can be converted into a hydroxyl group. Suitable capping agents include, without limitation, aminoalcohols such as ethanolamine and diethanolamine, solketal, diols such as neopentyl glycol, triols such as trimethylolpropane, and mixture of these. This method is useful for providing a plurality of hydroxyl groups at each end of the polymer.

Non-limiting examples of polyether polyols are polyalkylene ether polyols that include poly(oxytetraethylene) glycols, poly(oxy-1,2-propylene) glycols and poly(oxy-1,2-butylene) glycols. Also useful are polyether polyols formed from oxyalkylation of various polyols, for example, glycols such as ethylene glycol, 1,6-hexanediol, Bisphenol A and the like, or other higher polyols, such as trimethylolpropane, pentaerythritol and the like. Useful polyols of higher functionality can be made, for instance, by oxyalkylation of compounds such as sorbitol or sucrose. One commonly utilized oxyalkylation method is to react a polyol with an alkylene oxide, for example, ethylene or propylene oxide, in the presence of an acidic or basic catalyst.

The film-forming polyurethane may have a number average molecular weight of from about 4000 to about 25,000.

In one preferred embodiment the refinish clearcoat composition includes at least one further hydroxyl-functional acrylic polymer. The further acrylic polymer preferably has a number average molecular weight of less than about 5000, preferably less than about 4000. The further acrylic polymer is also preferably readily miscible with the hydroxyl-functional acrylic of the invention.

If a polymer other than the hydroxyl-functional acrylic resin of the invention polymerized using one or more cycloaliphatic monomers is included in the refinish clearcoat composition, then it is preferred that the nonvolatile binder material include at least about 2% by weight, preferably at least about 5% by weight, of the acrylic polymer of the invention, and up to about 95%, preferably up to about 80% of the nonvolatile polymers.

The refinish clearcoat composition may contain other materials, including additives such as rheology control agents, surfactants, stabilizers, UV absorbers, hindered amine light stabilizers, and so on. Optionally, the invention may include one or more waxes such as poly(ethylene-vinyl acetate) copolymers or other rheology control agents.

Preferably, the refinish clearcoat further includes a curing agent reactive with the acrylic polymer or another resin or polymer in the refinish clearcoat, for example a polyisocyanate such as, but not limited to, the isocyanurate of hexamethylene diisocyanate. If the curing agent is reactive at room temperature with the acrylic polymer or other polymer, then the curing agent is kept separately from the acrylic polymer or other reactive polymer until just prior to application, as a two-component (two-package) paint.

In one contemplated embodiment, the clearcoat composition is an ambient curing composition. One example of an ambient curing composition is a composition containing a polyisocyanate, as already described. Another example of an ambient curing composition is one containing an oxidatively-curing polymer, such as an alkyd. A further example of an ambient curing composition is a composition containing a resin or oligomer having ethylenically unsaturated functionality that is cured by exposure to actinic rations, such as from UV or visible light. The composition may further include a catalyst for the radiation cure.

In another embodiment, the invention provides an three-package system for preparing the clearcoat composition of the invention. The three-package system includes a first component containing the hydroxyl-functional acrylic polymer polymerized with the cycloaliphatic monomer, optionally in combination with one or more other resins or polymers. The second component includes a curing agent reactive with the hydroxyl-functional acrylic polymer and/or another polymer or resin of the first component. A third component includes a reducing solvent, optionally a further resin or polymer, and optionally a catalyst for the curing reaction.

The clearcoat composition may include one or more solvents. In general, the solvent can be any organic solvent or solvents suitable for the binder materials. The solvent or solvents may be selected from aliphatic solvents or aromatic solvents, for example ketones, esters, acetates, toluene, xylene, aromatic hydrocarbon blends, or a combination of any of these.

In the multi-component coating, the solvent can be included in any of the components. Generally, each of the components will include one or more kinds of organic solvent.

The refinish clearcoat of the invention is applied in a layer to a desired area of the substrate to be refinished over an applied basecoat layer. The basecoat layer is allowed to dry before the clearcoat composition is applied. The clearcoat composition is then cured, if it is a thermosetting composition. When the clearcoat composition is formulated as a low temperature bake composition, the clearcoat of the invention provides an advantage in it may be taped or sanded immediately after baking.

The refinished substrate may be an automotive vehicle or a component of an automotive vehicle. The coating compositions of the invention may, however, be applied to other articles for which a protective and/or decorative coating is desirable. Such articles may be those having parts or substrates that cannot withstand high temperature curing conditions or that cannot easily be placed in a high-bake oven.

The invention is further described in the following examples. The examples are merely illustrative and do not in any way limit the scope of the invention as described and claimed. All parts are by weight unless otherwise indicated.

EXAMPLE 1

Preparation of Acrylic Polymer

An acrylic polymer was prepared by polymerizing in about 93.6 parts by weight n-butyl acetate 69.3 parts by weight of isobornyl methacrylate, 10.5 parts by weight of 2-hydroxyethyl methacrylate, 19.6 parts by weight of addition polymerizable co-monomers, and 0.6 parts by weight of 2-mercaptoethanol with about 0.4 parts by weight of an azo-type initiator. The acrylic polymer product was reduced to about 55% nonvolatile with additional n-butyl acetate. The acrylic resin had a number average molecular weight of about 9000.

EXAMPLE 2

Preparation of a Clearcoat Composition

A Component A was prepared by combining 10.3 parts by weight of the acrylic resin of Example 1, 16.1 parts by weight of ethyl-ethoxypropionate, 61.2 parts by weight of a hydroxyl-functional acrylic (acid number of about 10 mg KOH/g, hydroxyl equivalent weight of about 450 g/eq OH, number average molecular weight of about 1000, about 79% nonvolatile in a blend of methyl isoamyl ketone, Aromatic 100, and n-butyl acetate), 9.2 parts by weight of xylene, and 3.3 parts by weight of an additive package containing UV absorbers, a tin catalyst, and other customary additives.

A clearcoat composition was prepared by combining three parts by volume of the Component A with one part by volume of DH-46 Hardener (available from BASF Coatings and Colorants, Automotive Refinish Division) and one part by volume of reducer UR-50 (also available from BASF Coatings and Colorants, Automotive Refinish Division).

Comparative Example A

Preparation of Comparative Clearcoat Composition

A clearcoat composition was prepared as in Example 2, but without the acrylic resin of Example 1. The Component A of Comparative Example A was prepared by combining 16.1 parts by weight of ethyl-ethoxypropionate, 61.2 parts by weight of the same hydroxyl-functional acrylic (acid number of about 10 mg KOH/g, hydroxyl equivalent weight of about 450 g/eq OH, number average molecular weight of about 1000, about 79% nonvolatile in a blend of methyl isoamyl ketone, Aromatic 100, and n-butyl acetate), 9.2 parts by weight of xylene, and 3.3 parts by weight of the same additive package. The Comparative Example A clearcoat composition was prepared by combining three parts of volume of this Component A with one part by volume of DH-46 Hardener and one part by volume of reducer UR-50.

Testing of Example 2 and Comparative Example A

The coating compositions of Example 2 and Comparative Example A were sprayed with a SATA 95 HVLP spray gun with a 1.5 mm tip at 2.96485×10$^5$ N/m$^2$ (43 psi) onto 30.5 cm×45.7 cm (12 inch×18 inch) primed aluminum panels. The coated panels were baked at 71° C. (160° F.) for 15 minutes. Both coatings had a film build in the target range of 45.7-55.9 microns (1.8-2.2 mils).

After cooling, a portion of each panel was taped off with masking tape. The remainder of each panel was wet sanded with 1200 grit paper and then buffed.

Sanding and buffing the clearcoat obtained from Example 2 was easy. No tape marks were left on the clearcoat from Example 2 when the tape was removed.

In comparison, the clearcoat produced from the Comparative Example A composition was hard to buff; in other words, it was difficult to bring on the shine again after the sanding. In addition, tape marks remained on the Comparative Example A panel when the tape was removed. The clearcoat in the area that had been taped was visibly disturbed by the tape removal.

EXAMPLES 3 and 4

These examples demonstrate the preferred embodiments of the invention.

The Component A of Example 3 was prepared by combining 4.8 parts by weight of the acrylic resin of Example 1, 15.4 parts by weight of ethyl-ethoxypropionate, 64.7 parts by weight of the same hydroxyl-functional acrylic as in Example 2 (acid number of about 10 mg KOH/g, hydroxyl equivalent weight of about 450 g/eq OH, number average molecular weight of about 1000, about 79% nonvolatile in a blend of methyl isoamyl ketone, Aromatic 100, and n-butyl acetate), 8.8 parts by weight of xylene, 2.9 parts by weight of n-butyl acetate, and 3.02 parts by weight of the same additive package as Example 2. A clearcoat composition was prepared by combining three parts by volume of the Component A of Example 3 with one part by volume of DH-46 Hardener and one part by volume of reducer UR-50.

The Component A of Example 4 was prepared by combining 10 parts by weight of the acrylic resin of Example 1, 15.9 parts by weight of ethyl-ethoxypropionate, 60.6 parts by weight of the same hydroxyl-functional acrylic as in Example 2 (acid number of about 10 mg KOH/g, hydroxyl equivalent weight of about 450 g/eq OH, number average molecular weight of about 1000, about 79% nonvolatile in a blend of methyl isoamyl ketone, Aromatic 100, and n-butyl acetate), 9.1 parts by weight of xylene, 1.1 parts by weight of n-butyl acetate, and 3.02 parts by weight of the same additive package as Example 2. A clearcoat composition was prepared by combining three parts by volume of the Component A of Example 3 with one part by volume of DH-46 Hardener and one part by volume of reducer UR-50.

Testing of Examples 3 and 4

The coating compositions of Examples 3 and 4 were sprayed as for Example 2, but onto automotive front hoods. The applied coating layers were baked at 71° C. (160° F.) for 15 minutes. Both coatings had a film build in the target range of 45.7-55.9 microns (1.8-2.2 mils).

After cooling, a portion of each hood was taped off with masking tape and the remaining portion was wet sanded with 1200 grit paper and then buffed. Both Examples had good sanding and did not leave tape marks, although tape tracks were noted for Example 3. Example 4 was easier to polish, though, and was more resistant to fingerprints. It was also noted that Example 4 was particularly resistant to staining by the polishing compound.

The invention has been described in detail with reference to preferred embodiments thereof. It should be understood, however, that variations and modifications can be made within the spirit and scope of the invention.

What is claimed is:

1. A refinish composition comprising
   (a) a hydroxyl-functional acrylic polymer, wherein the acrylic polymer has a number average molecular weight of at least about 5000 and is polymerized using at least about 45% by weight of a cycloaliphatic monomer, based on the total weight of monomers polymerized,
   (b) at least one film-forming polymer different from the acrylic polymer of (a) comprising a second hydroxyl-functional acrylic polymer, and
   (c) optionally, at least one curing agent for the acrylic polymer of (a) and/or the film-forming polymer of (b),
   wherein the acrylic polymer of(a) is from about 5% up to about 60% by weight of the combined weight of the acrylic polymer of (a) and the film-forming polymer or polymers of (b)
   and further wherein the refinish composition is a refinish clearcoat composition.

2. A refinish composition according to claim 1, wherein the hydroxyl-functional acrylic polymer of (a) is at least about 2% by weight, based on nonvolatile binder material.

3. A refinish composition according to claim 1, wherein the hydroxyl-functional acrylic polymer of(a) is at least about 5% by weight, based on nonvolatile binder material.

4. A refinish composition according to claim 1, wherein the acrylic polymer of (a) has a weight average molecular weight of at least about 17,000.

5. A refinish composition according to claim 1, wherein the cycloaliphatic monomer comprises a member selected from the group consisting of cyclohexyl acrylate, cyclohexyl methacrylate, isobornyl acrylate, isobornyl methacrylate, and combinations thereof.

6. A refinish composition according to claim 1, wherein the cycloaliphatic monomer is at least about 60% by weight, based on the total weight of monomers polymerized.

7. A refinish composition according to claim 1, wherein the cycloaliphatic monomer is up to about 85% by weight, based on the total weight of monomers polymerized.

8. A refinish composition according to claim 1, wherein the acrylic polymer of (a) has an hydroxyl number of from about 45 mg KOH/g polymer to about 75 mg KOH/g polymer.

9. A refinish composition according to claim 1, wherein the acrylic polymer of (a) is polymerized from monomers comprising from about 1% to about 25% by weight of a combination of styrene, n-butyl methacrylate, and n-butyl acrylate, based on the total weight of monomers polymerized.

10. A refinish composition according to claim 1, wherein an about 55% by weight solution of the acrylic polymer of (a) in n-butyl acetate has a viscosity less than or equal to about 10 Stokes at 25° C.

11. A refinish composition according to claim 1, wherein an about 55% by weight solution of the acrylic polymer of (a) in n-butyl acetate has a viscosity less than or equal to about 8.8 Stokes at 25° C.

12. A refinish multi-component coating composition, comprising
   (a) a first component comprising (i) a hydroxyl-functional acrylic polymer that has a number average molecular weight of at least about 5000 and is polymerized using at least about 45% by weight of a cycloaliphatic monomer, based on the total weight of monomers polymerized the hydroxyl-functional acrylic polymer and (ii) at least one film-forming polymer different from the acrylic polymer of (i) comprising a second hydroxyl-functional acrylic polymer wherein the acrylic polymer of (i) is from about 5% up to about 60% by weight of the combined weight of the acrylic polymer of (i) and the film-forming polymer or polymers of (ii) and
   (b) a second component comprising a curing agent reactive with the hydroxyl-functional acrylic polymer of (a)(i) and/or the film-forming polymer or polymers of (a) (ii);
   wherein the refinish coating composition is a clearcoat composition.

13. A refinish multi-component coating composition according to claim 12, wherein the curing agent is reactive with the hydroxyl-functional acrylic polymer of (a)(i).

14. A refinish multi-component coating composition according to claim 12, wherein the at least one film-forming polymer of (a)(ii) is reactive with the curing agent.

15. A method of refinishing a substrate, comprising steps of:
   (a) applying to a desired area of the substrate a layer of a refinish basecoat composition;
   (b) allowing the applied layer of basecoat composition to dry; and
   (c) applying over the layer of basecoat composition a refinish clearcoat composition comprising (i) a hydroxyl-functional acrylic polymer, wherein the acrylic polymer has a number average molecular weight of at least about 5000 and is polymerized using at least about 45% by weight of a cycloaliphatic monomer, based on the total weight of monomers polymerized, (ii) at least one film-forming polymer different from the acrylic polymer of (i) comprising a second hydroxyl-functional acrylic polymer wherein the acrylic polymer of (i) is from about 5% up to about 60% by weight of the combined weight of the acrylic polymer of (i) and the film-forming polymer or polymers of (ii), and, optionally, (iii) at least one curing agent reactive with the acrylic polymer of (i) and/or the film-forming polymer of (ii).

16. A method according to claim 15, wherein the clearcoat composition includes the at least one curing agent of (c)(iii).

17. A method according to claim 16, wherein the at least one curing agent of (c)(iii) comprises at least one material reactive with the hydroxyl-functional acrylic polymer of (c) (i).

18. A method according to claim 17, wherein the material reactive with the hydroxyl-functional acrylic polymer of (c) (i) comprises the isocyanurate of hexamethylene diisocyanate.

19. A method according to claim 15, wherein the substrate is an automotive vehicle or a component of an automotive vehicle.

20. A refinished substrate prepared according to the method of claim 15.

21. A refinish composition according to claim 1, wherein the second hydroxyl-functional acrylic polymer has a number average molecular weight of less than about 5000.

22. A refinish composition according to claim 1, wherein the hydroxyl-functional acrylic polymer that is polymerized using at least about 45% by weight of a cycloaliphatic monomer has a number average molecular weight of at least about 8000.

23. A method of refinishing a substrate according to claim 15, wherein the hydroxyl-functional acrylic polymer that is polymerized using at least about 45% by weight of a cycloaliphatic monomer has a number average molecular weight of at least about 8000.

24. A method of refinishing a substrate according to claim 23, wherein the clearcoat composition comprises as a film-forming polymer of (c)(ii) an hydroxyl-functional acrylic polymer having a number average molecular weight of less than about 5000.

* * * * *